United States Patent

Oka et al.

[11] Patent Number: 5,880,475
[45] Date of Patent: Mar. 9, 1999

[54] SCINTILLATION FIBER TYPE RADIATION DETECTOR

[75] Inventors: Toru Oka; Yoshikazu Tsutaka, both of Tokyo, Japan

[73] Assignee: Mitsubishi Denki Kabushiki Kaisha, Tokyo, Japan

[21] Appl. No.: 867,883

[22] Filed: Jun. 3, 1997

[30] Foreign Application Priority Data

Dec. 27, 1996 [JP] Japan ................................. 8-350170

[51] Int. Cl.⁶ .................................................. G01T 1/20
[52] U.S. Cl. ........................ 250/483.1; 250/368
[58] Field of Search .................... 250/368, 367, 250/486.1, 483.1

[56] References Cited

U.S. PATENT DOCUMENTS

| | | | |
|---|---|---|---|
| 5,266,808 | 11/1993 | Siegmund et al. | 250/368 |
| 5,675,151 | 10/1997 | Oka et al. | 250/368 |

FOREIGN PATENT DOCUMENTS

| | | | |
|---|---|---|---|
| 57-50672 A | 3/1982 | Japan | 250/368 |
| 57-76466 A | 5/1982 | Japan | 250/368 |
| 59-92375 A | 5/1984 | Japan | 250/368 |
| 62-116284 A | 5/1987 | Japan | 250/367 |

OTHER PUBLICATIONS

"Measurement of Spatial Dose–Rate Distribution Using a Position Sensitive Detector" by Emoto et al, pp. 119–125, Proceedings of the 8th Workshop on Radiation Detectors and Their Uses, Jan. 1994.

"Neutron Radiation Distribution Sensor Using Flexible Plastic Scintillating Fiber Combined with the Time–of–Flight Technique", by Takada et al, IEEE Transactions on Nuclear Science, vol. 42, No. 4, Aug. 1995 pp. 570–574.

*Primary Examiner*—Constantine Hannaher
*Attorney, Agent, or Firm*—Sughrue, Mion, Zinn, Macpeak & Seas, PLLC

[57] ABSTRACT

A radiation detector obtains radiation information by detecting a light pulse occurred in response to a radiation in a scintillation fiber at one end or opposite ends of the scintillation fiber. The scintillation fiber is surrounded by a scattering member which emits an electron by interaction with the radiation.

11 Claims, 8 Drawing Sheets

FIG. 14(a)

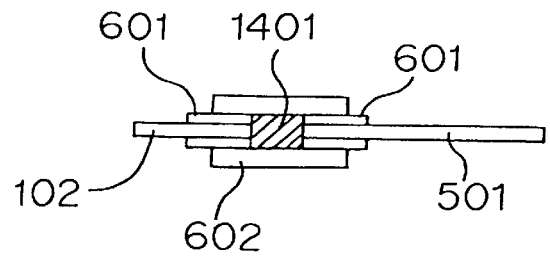

FIG. 14(b)

LIGHT INCIDENT AT AN ANGLE ABOVE THE NUMERICAL APERTURE OF AN OPTICAL FIBER FOR TRANSMISSION

LIGHT INCIDENT AT AN ANGLE NOT GREATER THAN THE NUMERICAL APERTURE OF AN OPTICAL FIBER FOR TRANSMISSION

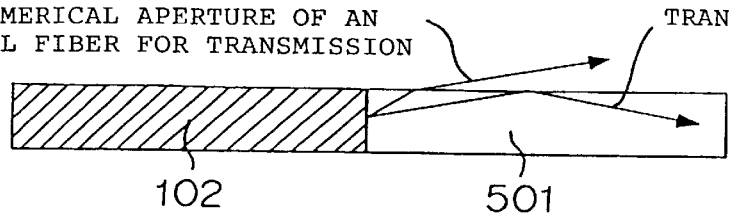

FIG. 14(c)

ANGLE NOT GREATER THAN THE NUMERICAL APERTURE OF AN OPTICAL FIBER FOR TRANSMISSION

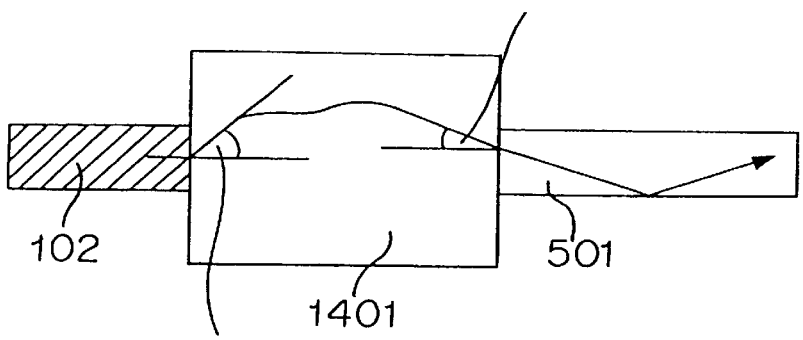

ANGLE NOT GREATER THAN THE NUMERICAL APERTURE OF AN OPTICAL FIBER FOR TRANSMISSION

SCINTILLATION FIBER TYPE RADIATION DETECTOR

The present invention relates to a radiation detector which uses a scintillation fiber to detect an incident position, a radiation dose or a radiation dose-rate of a radiation in a monitoring required environment such as a radiation controlled area.

In FIG. 16, there is shown a block diagram of the structure of a conventional scintillation fiber type radiation detector which has been described in e.g. "radiation detectors and their application" (published by High Energy Physics Research Institute on Jan. 26 and 27, 1994). In this figure, reference numeral 1 designates a collimated radiation. Reference numerals 2a and 2b designate light pulses produced by fluorescent. Reference numeral 3 designates a scintillation fiber. Reference numerals 4a and 4b designate two light-receiving elements which are connected to opposite ends of the scintillation fiber 3. Reference numerals 5a and 5b designate two pre-amplifiers. Reference numerals 6a and 6b designate two constant-fraction discriminators. Reference numeral 7 designates a signal delay circuit. Reference numeral 8 designates a time-to-amplitude convertor. Reference numeral 9 designates an analog-digital convertor. Reference numeral 10 designates a multichannel pulse-height analyzer as a radiation analyzer.

The operation of the radiation detector will be explained. When the radiation 1 is incident on the scintillation fiber 3, fluorescence occurs in the scintillation fiber 3 and the resulting light pulses 2a and 2b are transmitted to the opposite ends of the scintillation fiber 3.

The two light pulses 2a and 2b are inputted in the light-receiving elements 4a and 4b, are converted into electrical pulse signals there, are inputted into the time-to-amplitude convertor 8 through the constant-fraction discriminators 6a and 6b, and the signal delay circuit 7. An electrical pulse is outputted from the time-to-amplitude converter 8 so as to have a pulseheight in proportion to the time difference between the time periods required for the light pulses to reach the respective light-receiving elements 4a and 4b. The pulse from the time-to-amplitude convertor is inputted into the analog-digital convertor 9.

Although more than one radiation 1 can be incident on the scintillation fiber 3, it is possible to see the incident positions of the radiations 1 by discriminating the pulseheights of the electrical pulses at the multichannel pulse-height analyzer 10, and to detect a radiation dose-rate based on count.

The conventional scintillation fiber 3 is constituted by a single member except that it is covered by a shade tube.

Since the conventional scintillation fiber type radiation detector has the scintillation fiber 3 constituted by a single member as stated earlier, the radiation detector has created a problem in that the probability of interaction is low and detection sensitivity is low since a radiation having a penetrative capacity penetrates the scintillation fiber. In addition, since the scintillation fiber itself has great transmission loss, the scintillation fiber is not good at sensitivity and energy characteristics, causing a measurable range of the radiation dose-rate and long-distance transmission to be limited.

It is an object of the present invention to solve these problems, and to provide a radiation detector capable of improving sensitivity, improving energy characteristics, expanding the range of a radiation dose-rate to be measured and establishing long-distance transmission.

According to a first aspect of the present invention, a scintillation fiber type radiation detector has a scintillation fiber arranged in or on a scattering member for emitting an electron by interaction with a radiation.

According to a second aspect of the present invention, the radiation detector has a plurality of scintillation fibers arranged in or on the scattering member.

According to a third aspect of the present invention, the radiation detector has a groove formed in the scattering member to arrange at least one scintillation fiber therein.

According to a fourth aspect of the present invention, the radiation detector has at least one scintillation fiber connected to at least one optical fiber for transmission having lower transmission loss than the scintillation fiber.

According to a fifth aspect of the present invention, the radiation detector has connecting ends of the scintillation fiber and the optical fiber for transmission covered by inner connection pipes so that the inner connection pipes have connecting end surfaces arranged to be flush with connecting end surfaces of the scintillation fiber and the optical fiber, the inner connection pipes having respective inner diameters identical to respective outer diameters of the scintillation fiber and the optical fiber. The scintillation fiber and the optical fiber are connected by inserting the inner connection pipes in a single outer connection pipe having respective inner diameters identical to respective outer diameter of the respective inner connection pipes.

According to a sixth aspect of the present invention, the radiation detector has connecting ends of the scintillation fiber and the optical fiber for transmission covered by inner connection pipes so that the inner connection pipes have connecting end surfaces arranged to be flush with connecting end surfaces of the scintillation fiber and the optical fiber, the inner connection pipes having respective inner diameters identical to respective outer diameters of the scintillation fiber and the optical fiber. The scintillation fiber and the optical fiber are connected by inserting the inner connection pipes in a single outer connection pipe having respective inner diameter identical to respective outer diameters of the respective inner connection pipes, and interposing an optical element having a light-gathering function between the scintillation fiber and the optical fiber.

According to a seventh aspect of the present invention, the radiation detector has a plurality of scintillation fibers and a plurality of optical fibers for transmission connected to provide a plurality of composite fibers. The composite fibers are arranged to have a portion with the scintillation fiber included therein relatively shifted in a longitudinal direction thereof.

According to an eighth aspect of the present invention, the radiation detector has the scintillation fiber and the optical fiber for transmission connected to provide a composite fiber. The composite fiber has only a portion with the scintillation fiber included therein as a radiation detecting portion provided with the scattering member. A light signal from the radiation detection portion is transmitted to the optical fiber.

According to a ninth aspect of the present invention, the radiation detector has the scattering member made of a noncombustible material and the scintillation fiber made of a quartz material.

According to a tenth aspect of the present invention, the radiation detector has the scintillation fiber spirally arranged in or on the scattering member.

According to an eleventh aspect of the present invention, the radiation detector has the scattering member with the scintillation fiber arranged therein or thereon is wound with a heat isolating tape.

According to a twelfth aspect of the present invention, the radiation detector has a plurality of scattering members made of different materials and a plurality of scintillation fibers surrounded by the different scattering members.

As described, according to the first aspect of the present invention, the scintillation fiber can be arranged in or on the scattering member for emitting an electron by interaction with the radiation to improve sensitivity, improve energy characteristics, expand the range of a radiation dose-rate and establish long-distance transmission. As a result, a wide range of environmental monitoring can be carried out with higher accuracy by a single system to reduce cost.

According to the second aspect of the present invention, a plurality of scintillation fibers can be arranged in or on the scattering member to further raise the probability of reaction with a radiation, increasing the amount of light of a produced light pulse. This can further improve sensitivity, improve energy characteristics, expand the range of a radiation dose-rate and establish long-distance transmission.

According to the third aspect of the present invention, the scattering member which emits an electron by interaction with the radiation has the groove formed therein, and the scintillation fiber is arranged in the groove. As a result, the scintillation fiber can be protected against an external pressure, be prevented from being damaged or broken on and after installation, and have increased mechanical strength.

According to the fourth aspect of the present invention, the scintillation fiber can be connected to the optical fiber for transmission having lower transmission loss than the scintillation fiber to establish long-distance transmission of the light produced in the scintillation fiber. This enables further long-distance transmission of a light signal to carry out monitoring in a wider range. In addition, a detecting unit and a measuring unit can be remotely installed to realize telemetering.

According to the fifth aspect of the present invention, when the scintillation fiber and the optical fiber for transmission are connected together, the scintillation fiber and the optical fiber for transmission have the connecting ends covered by inner connection pipes so that the inner connection pipes have the connecting end surfaces arranged to be flush with the connecting end surfaces of the scintillation fiber and the optical fiber, the inner connection pipes have the respective inner diameters identical to the respective outer diameters of the scintillation fiber and the optical fiber. The scintillation fiber and the optical fiber are connected by inserting the inner connection pipes in the single outer connection pipe having the respective inner diameters identical to the respective outer diameters of the respective inner connection pipes. This arrangement can make the connected portion firm and small. The presence of the connecting portion does not interfere with arrangement of the scintillation fiber in or on the scattering member. The connecting portion can have increased mechanical strength.

According to the sixth aspect of the present invention, when the scintillation fiber and the optical fiber for transmission are connected together, the scintillation fiber and the optical fiber have the connecting ends covered by the inner connection pipes so that the inner connection pipes have the connecting end surfaces arranged to be flush with the connecting end surfaces of the scintillation fiber and the optical fiber, the inner connection pipes having respective inner diameters identical to the respective outer diameters of the scintillation fiber and the optical fiber. The scintillation fiber and the optical fiber are connected by inserting the inner connection pipes in the single outer connection pipe having the respective inner diameters identical to the respective outer diameters of the respective inner connection pipes, and interposing the optical element having a light-gathering function between the scintillation fiber and the optical fiber. As a result, loss due to the difference between the numeral apertures of the scintillation fiber and the optical fiber for transmission can be reduced to improve sensitivity, improve energy characteristics, expand the range of a radiation dose-rate and establish long distance transmission.

According to the seventh aspect of the present invention, the plurality of scintillation fibers and the plurality of optical fibers for transmission are connected to provide the plurality of composite fibers, and the composite fibers are arranged to have a portion with the scintillation fiber included therein relatively shifted in a longitudinal direction thereof. This arrangement can arrange the radiation detecting portion in a wide range to carry out radiation monitoring in a wider range.

According to the eighth aspect of the present invention, the scintillation fiber in the scattering member is connected to the optical fiber for transmission having lower transmission loss than the scintillation fiber, the scattering member is arranged only on the radiation detecting portion with the scintillation fiber included therein, and the light signal from the radiation detecting portion is transmitted through the optical fiber without the scattering member arranged thereon, allowing the cost incurred by use of the scattering member to be reduced and production process to be simplified.

According to the ninth aspect of the present invention, the scattering member which emits an electron by interaction with the radiation is made of a noncombustible material, and the scintillation fiber is made of a quartz material. As a result, the radiation detector can have a high-temperature-resistant property and a fire-resistant property.

According to the tenth aspect of the present invention, the scintillation fiber can be spirally arranged in or on the scattering member to equalize the sensitivity of the detecting portion irrespectively of the incident direction of the radiation. Even if bending stress is applied to the detecting portion including the scattering member, stress concentration is prevented at a location where the scintillation fiber or the optical fiber for transmission is arranged. In addition, an increase in mechanical strength can be realized.

According to the eleventh aspect of the present invention, the scintillation fiber is arranged in or on the scattering member, and the scattering member is wound with the heat insulating tape, allowing the scintillation fiber to be restrained from deformation and deterioration due to heat.

According to the twelfth aspect of the present invention, the respective scattering members which are arranged on the scintillation fibers are made of different materials. This arrangement can give different energy characteristics to the respective scintillation fibers which are arranged at different positions. It is possible to widen the measurable range for radioactive energy to be measured.

The invention will now be described by of way example and with reference to the accompanying drawings in which:

FIG. 1(a) and (b) are schematic views showing the essential parts of the radiation detector according to a first embodiment of the present invention;

FIGS. 2(a) and (b) are schematic views showing the essential parts of the radiation detector according to a second embodiment of the present invention;

FIG. 14(a) is a cross-sectional view showing the essential parts of the radiation detector according to a fifteenth embodiment of the present invention, and FIGS. 14(b) and (c) are explanatory diagrams showing how light is transmitted;

EMBODIMENT 1

Figure 1A:
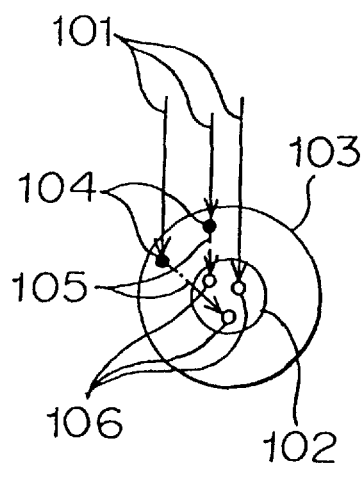
Figure 1B:
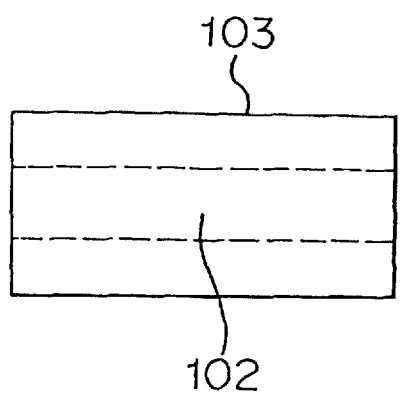

Now, a first embodiment according to the present invention will be described with reference to the accompanying drawings. In FIGS. 1(a) and (b), there are shown schematic views showing the essential parts of the radiation detector according to the first embodiment of the present invention, wherein FIG. 1(a) is a cross-sectional view of a scintillation fiber, and FIG. 1(b) is a longitudinal cross-sectional view of the scintillation fiber. In these figures, reference numeral 101 designates radiations to be measured. Reference numeral 102 designates the scintillation fiber. Reference numeral 103 designates a scattering member which emits an electron by interaction with a radiation 101, and which surrounds the scintillation fiber. Reference numeral 104 designates interaction points where the radiations 101 interact with the scattering member 103. Reference numeral 105 designates electrons, or electrons and radiations which have occurred at the interaction points 104. Reference numeral 106 designates fluorescent points which are produced by incidence of the electrons, or the electrons and the radiations 105.

The operation of the detector will be explained.

When the radiations 101 are incident on the radiation detector thus constructed, some of the radiations directly interact with the scintillation fiber 102 to emit electrons so as to produce fluorescent light at the fluorescent points 106. Some of the radiations interact with the scattering member 103 at the interact points 104 to emit electrons, or electrons and radiations 105, and then the electrons, or the electrons and the radiations 105 interact with the scintillation fiber 102 to produce fluorescent light.

When the scattering member 103 is absent, the radiations 101 need to interact directly with the scintillation fiber 102 to produce the fluorescent light. In that case, some of the radiations 101 penetrate the scintillation fiber 102 without interaction therewith. Even if some of the radiations interact with the scintillation fiber to emit electrons, some of the electrons go out of the scintillation fiber 102 without giving the entire energy to the scintillation fiber 102. The sensitivity of the radiation detector is determined by whether the fluorescent light can be counted in the scintillation fiber 102 or not. It is determined by probability of the radiations 101 interacting with the scintillation fiber 102, and whether the amount of light emission of the fluorescent can be detected by a measuring unit or not. This means that it is possible to improve the sensitivity of the radiation detector by raising the probability of the interaction between the radiations 101 and the scintillation fiber 102, or by increasing the energy imparting amount to the scintillation fiber 102 due to the interaction.

In accordance with the first embodiment, the scintillation fiber 102 is surrounded by the scattering member 103 which emits electrons by interaction with the radiations, and which is made of e.g. polyethylene. This arrangement can cause the electrons and the radiations 105 emitted from the interaction points 104 to interact with the scintillation fiber 102 and produce fluorescent so as to raise the probability of the interaction between the radiations 101 and the scintillation fiber 102 even if some of the radiations 101 do not directly interact with the scintillation fiber 102. In addition, this arrangement can provide the scattering member 103 with greater energy than that generated in the scintillation fiber 102, depending on the atomic number of the scattering member 103 and the energy of the radiations 101. If the energy provided in the scattering member 103 can be sufficiently transmitted to the scintillation fiber 102, the provision of the energy at the fluorescent points 106, i.e. the amount of light emission of the fluorescent can be increased in comparison with the absence of the scattering member 103 around the scintillation fiber 102. If the scattering member is made of a material having a high atomic number, the probability of the interaction with the radiations can be increased.

By increasing the probability of the interaction and the amount of the light emission of the fluorescent, not only the sensitivity of the radiation detector can be improved, but also the minimum measurable radiation dose-rate can be lowered to expand the range of the radiation dose-rate. The energy characteristics as indication of the sensitivity of the radiation detector to the energy of radiations, which are desired to have nearly constant sensitivity in a wide energy range, can be brought to be nearly constant by selecting a suitable material as the scattering member. Selection of such a suitable material leads to improvement of the energy characteristics. In addition, an increase in the fluorescent amount in the scintillation fiber can make the transmission to a measuring unit long-distance.

EMBODIMENT 2

Figure 2A:
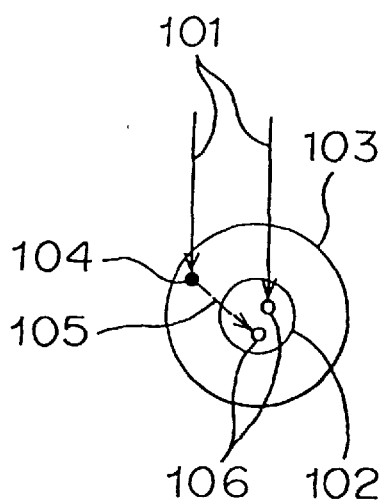
Figure 2B:
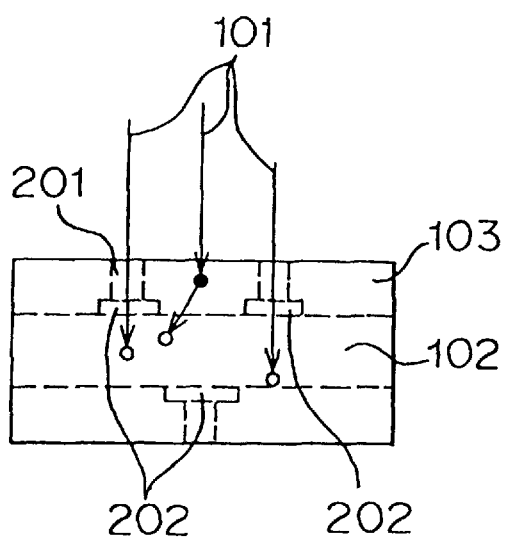

In FIGS. 2(a) and (b), there are shown schematic views of the essential parts of the radiation detector according to a second embodiment of the present invention. Although the scattering member 103 which is arranged around the scintillation fiber 102 has no through hole formed therein in the first embodiment, the scattering member 103 has through holes 201 formed therein in a radial direction in the second embodiment as shown in FIGS. 2(*b*). The through holes 201 have shade tapes 202 arranged therein in touch with the scintillation fiber 102 in order to prevent light from entering directly into the scintillation fiber 103. Such arrangement can let some radiations 102 to be incident directly on the scintillation fiber, allowing advantages similar to the first embodiment to be offered and also different sensitivity, different energy characteristics, different ranges of radiation dose-rate to be given to different portions of the fiber. In such arrangement, a combination with a scattering member having a high atomic number can make high sensitivity compatible with flat energy characteristics.

EMBODIMENT 3

Figure 3:
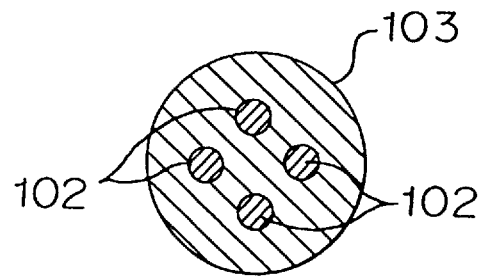
FIG. 3 is a cross-sectional view showing the essential parts of the radiation detector according to a third embodiment of the present invention.

In FIG. 3, there is shown a cross-sectional view of the essential parts of the radiation detector according to a third embodiment of the present invention. A plurality of scintillation fibers 102 are arranged in the scattering member 103 to offer advantages similar to the first embodiment. In addition, the provision of the plurality of scintillation fiber 102 can further increase the probability that the radiations interact with the scintillation fibers 102. When a single radiation interacts with the plurality of the scintillation fibers 102 to produce fluorescent in the scintillation fibers, a light receiving amount per one pulse can be increased to obtain an advantage similar to an increase in the fluorescent amount by connecting a single photodetector to one end or opposite ends of the collection of the scintillation fibers.

EMBODIMENT 4

Figure 4:
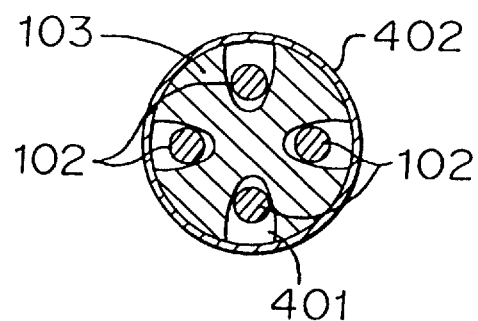
FIG. 4 is a cross-sectional view showing the essential parts of the radiation detector according to a fourth embodiment of the present invention.

In FIG. 4, there is shown a cross-sectional view of the essential parts of the radiation detector according to a fourth embodiment of the present invention. The scattering member 103 which emits electrons by interaction with the radiation have grooves 401 formed therein, and the grooves 401 have the scintillation fibers 102 arranged therein. The scattering member 103 have a shade tape 402 arranged thereon to prevent disturbance light from entering the scintillation fiber 102, thereby avoiding reaction with light irrelevant to radiations to be measured. Such arrangement can protect the scintillation fibers 102 against an external pressure to prevent the scintillation fibers from being damaged or broken on and after installation.

EMBODIMENT 5

Figure 5:
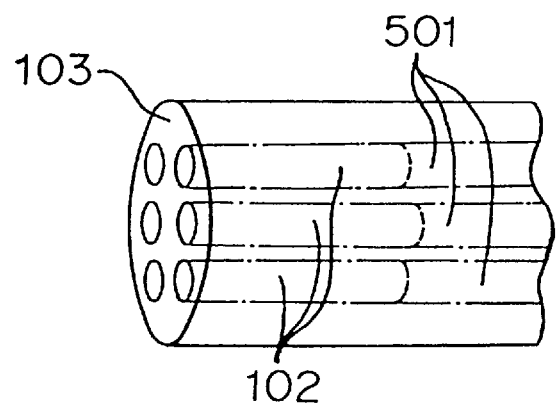
FIG. 5 is a schematic view showing the essential parts of the radiation detector according to a fifth embodiment of the present invention.

In FIG. 5, there is shown a schematic view of the essential parts of the radiation detector according to a fifth embodiment of the present invention. In FIG. 5, reference numeral 501 designates optical fibers for transmission which have lower transmission loss than the scintillation fibers 102, and which constitute the radiation detecting unit using the scintillation fibers 102. The optical fibers for transmission 501 are connected to one end or opposite ends of each scintillation fiber 102. The radiation detector thus constructed have one end or each end connected to a measuring unit which detects scintillation light caused by a radiation. The optical fibers for transmission 501 are made of a material which causes no reaction even if a radiation is incident thereon.

The scintillation fibers generally have great transmission loss, and the scintillation fibers alone are difficult to carry out a wide range of measurement as the detecting unit. In order to cope with this problem, the scattering member 103 is arranged to surround the scintillation fiber 102, and the optical fibers for transmission 501 are connected to the scintillation fibers to restrain the transmission loss in the scintillation fibers 102 by a reduction in the length of the scintillation fibers.

It is preferable that the optical fibers for transmission 501 are quartz fibers having low transmission loss. Connection between the scintillation fibers and the optical fibers may be made by use of a silicone adhesive agent, or by use of connectors having low connection loss such as F01 type connectors under Japanese Industrial Standard.

Such arrangement can offer advantages similar to the first embodiment and enable further long-distance transmission. In addition, the radiation detecting unit and the measuring unit can be remotely installed to realize telemetering.

EMBODIMENT 6

Figure 6:
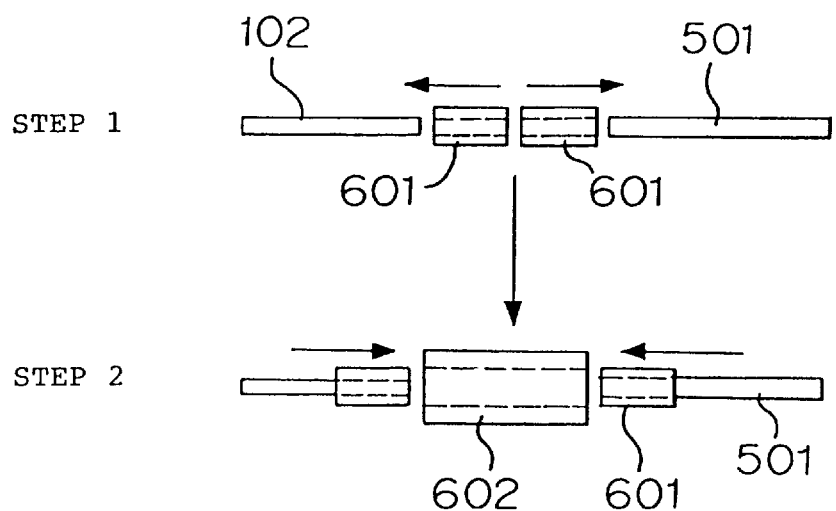
FIG. 6 is a schematic view showing how to connect a scintillation fiber and an optical fiber for transmission in the radiation detector according to a sixth embodiment of the present invention.

In FIG. 6, there is shown a schematic view explaining how to connect a scintillation fiber and an optical fiber for transmission in the radiation detector according to a sixth embodiment of the present invention. In FIG. 6, reference numeral 601 designates inner connection pipes which have respective inner diameters identical to respective outer diameter of the scintillation fiber 102 and the optical fiber for transmission 501. These inner connection pipes 601 have the same outer diameter in this embodiment. Reference numeral 602 designates an outer connection pipe which has the same outer diameter as those of the inner connection pipes 601. Light from the scintillation fiber 102 can be effectively directed to the optical fiber for transmission 501 by aligning the center axes of the scintillation fiber 102, the optical fiber for transmission 501, the inner connection pipes 601 and the outer connection pipe 602.

In a first step, the scintillation fiber 102 and the optical fiber for transmission 501 are inserted into the respective inner connection pipes 601. The scintillation fiber and the optical fiber for transmission are fixed to the inner connection pipes 601 by use of e.g. an adhesive agent so that the inner connection pipes have connecting end surfaces flush with connecting end surfaces of the fibers 102 and 501.

In a second step, the inner connection pipe 601 with the scintillation fiber 102 inserted therein and the inner connection pipe 601 with the optical fiber for transmission 501 inserted therein are inserted into the outer connection pipe 602 having the inner diameter identical to the outer diameters of the inner connection pipes 601. At that time, an optical cement is applied to the end surfaces of the respective fibers, and the fibers are fixed so as to have the end surface bonded together. By making the outer diameters of the connection pipes 601 and 602 as small as possible, the connection portion can be firm and miniaturized to prevent the connecting portion from interfering with arrangement of the scintillation fiber 102 in or on the scattering member, and to enable improvement of mechanical strength.

EMBODIMENT 7

Figure 7:
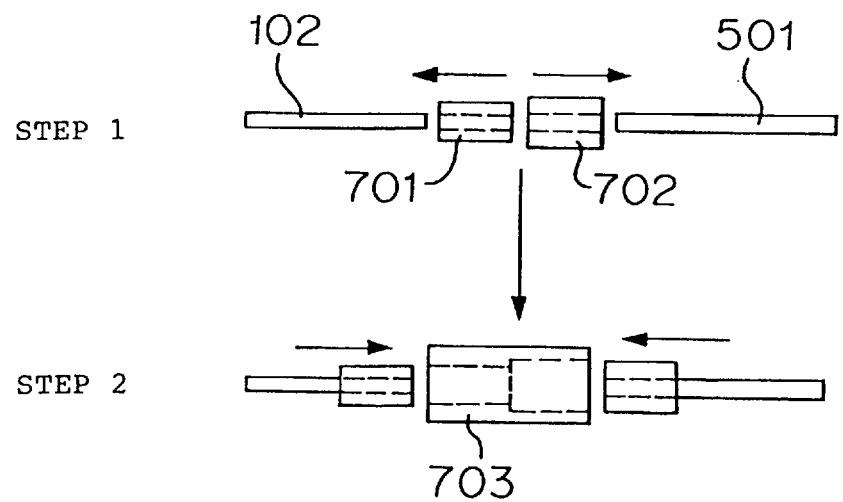
FIG. 7 is a schematic view showing how to connect a scintillation fiber and an optical fiber for transmission in the radiation detector according to a seventh embodiment of the present invention.

In FIG. 7, there is shown a schematic view explaining how to connect a scintillation fiber and an optical fiber for transmission in the radiation detector according to a seventh embodiment of the present invention. In FIG. 7, reference numeral 701 designates an inner connection pipe which has an inner diameter identical to the outer diameter of the scintillation fiber 102. Reference numeral 702 designates another inner connection pipe which has an inner diameter identical to the outer diameter of the optical fiber for transmission 501. Reference numeral 703 designates an outer connection pipe which has the inner diameter of a part formed to be identical to the outer diameter of the outer connection pipe 701, and the inner diameter of the other part formed to be identical to the outer diameter of the inner connection pipe 702. Light from the scintillation fiber 102 can be effectively directed to the optical fiber for transmission 501 by aligning the center axes of the scintillation fiber 102, the optical fiber for transmission 501, the inner connection pipe 701, the inner connection pipe 702 and the outer connection pipe 703.

In a first step, the scintillation fiber 102 and the optical fiber for transmission 501 are inserted into the inner connection pipe 701 and the inner connection pipe 702, respectively. The scintillation fiber and the optical fiber for transmission are fixed to the inner connection pipes by use of e.g. an adhesive agent so that the inner connection pipes 701 and 702 have connecting end surfaces flush with the connecting end surfaces of the fibers 102 and 501.

In a second step, the inner connection pipe 701 with the scintillation fiber 102 inserted therein and the inner connection pipe 702 with the optical fiber for transmission 501 inserted therein are inserted into the outer connection pipe 703. At that time, an optical cement is applied to the end surfaces of the fibers, and the fibers are fixed so as to have the end surfaces bonded together. By making the outer diameters of the pipes 701–703 as small as possible, the connecting portion can be firm and miniatured to prevent the connecting portion from interfering with arrangement of the scintillation fiber in or on the scattering member, and to enable improvement in mechanical strength.

EMBODIMENT 8

Figure 8:
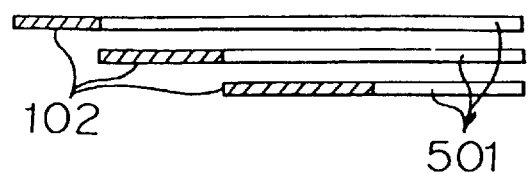
FIG. 8 is a schematic view showing the essential parts of the radiation detector according to an eighth embodiment of the present invention.

In FIG. 8, there is shown a schematic view of the essential parts of the radiation detector according to an eighth embodiment of the present invention. When a plurality of scintillation fibers 102 are arranged in or on the scattering member (not shown), and the respective scintillation fibers 102 are connected to optical fibers for transmission 501, the locations of the respective scintillation fibers 102 are shifted in a longitudinal direction so as to prevent the scintillation fibers from overlapping as shown in FIG. 8. Such arrangement can arrange the radiation detecting unit in a wide range to carry out radiation monitoring in a wide range with transmission loss of fluorescent minimized.

EMBODIMENT 9

Figure 9:
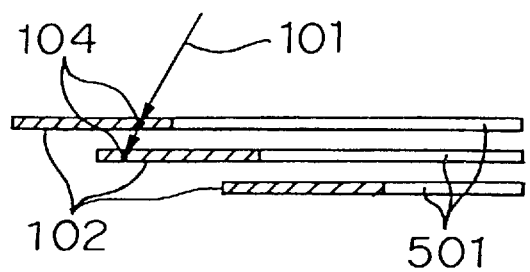
FIG. 9 is a schematic view showing the essential parts of the radiation detector according to a ninth embodiment of the present invention.

In FIG. 9, there is shown a schematic view of the essential parts of the radiation detector according to a ninth embodiment of the present invention. When a plurality of scintillation fibers are arranged in the radiation detector, and the respective scintillation fibers are connected to optical fibers for transmission 501, the scintillation fibers 102 are shifted in a longitudinal direction so as to have at least two of the scintillation fibers overlapped in the longitudinal direction as shown in FIG. 9 though the scintillation fibers 102 are arranged not to overlap in the longitudinal direction in the eighth embodiment. Such arrangement can arrange the radiation detecting portion in a wide range, and increase the probability of the interaction between a radiation and the scintillation fibers 102 to raise sensitivity.

EMBODIMENT 10

Figure 10:
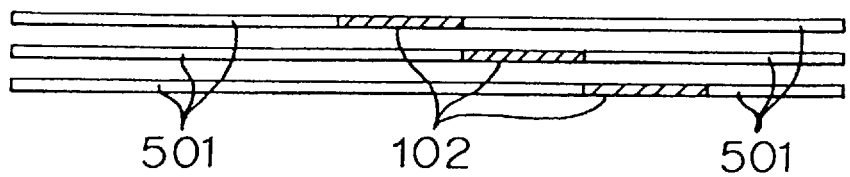
FIG. 10 is a schematic view showing the essential parts of the radiation detector according to a tenth embodiment of the present invention.

In FIG. 10, there is shown a schematic view of the essential parts of the radiation detector according to a tenth embodiment of the present invention. When a plurality of scintillation fibers 102 are arranged in the detector, and the respective scintillation fiber are connected to optical fibers for transmission 501, the respective scintillation fibers 102 may have opposite ends connected to the optical fibers for transmission 501 in some radiation detecting systems as shown in FIG. 10, though each scintillation fiber 102 has one end connected to an optical fiber for transmission 501 in the eighth embodiment and the ninth embodiment. Although the scintillation fibers 102 are shifted in a longitudinal direction so as not to prevent from overlapping in the longitudinal direction in FIG. 10, the scintillation fibers may be arranged so as to overlap like the ninth embodiment. Such arrangement can utilize fluorescence which is transmitted in opposite directions of the scintillation fibers. In addition, the incident position of a radiation can be measured based on the time difference of fluorescent pulses which are detected at opposite end of the detecting portion.

EMBODIMENT 11

In accordance with an eleventh embodiment of the present invention, the scattering member 103 which emits an electron by interaction with a radiation is made of a noncombustible material such as iron or copper, and the scintillation fiber 102 is made of a quartz material with cerium filled charged therein in the radiation detectors provided according to the respective embodiments. Such construction can realize a radiation detector having a fire-resistant property and a high-temperature-resistant property.

EMBODIMENT 12

Figure 11:
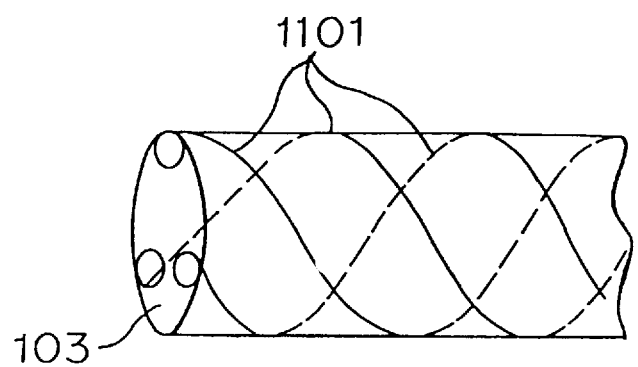
FIG. 11 is a schematic view showing the essential parts of the radiation detector according to a twelfth embodiment of the present invention.

In FIG. 11, there is shown a schematic view of the essential parts of the radiation detector according to a twelfth embodiment of the present invention. In this figure, reference numeral 1101 designates scintillation fibers which are spirally arranged on the scattering member 103, or composite fibers constituted by scintillation fibers and optical fibers for transmission.

The operation of this embodiment will be explained.

When a plurality of composite fibers 101 with the scintillation fibers 102 included therein are linearly arranged in or on the scattering member, the sensitivity of the scintillation fibers 102 as the radiation detecting portion is different depending on the incident direction of a radiation. By spirally arranging the composite fibers 101 with the scintillation fiber 102 included therein as shown in FIG. 11, the sensitivity of the respective scintillation fibers 102 can be equalized in respective spiral pitches. In addition, such spiral arrangement of the scintillation fibers can prevent stress from concentrating on the location of the scintillation fibers or the optical fibers for transmission even if bending stress is applied to the radiation detecting portion including the scattering member 103.

EMBODIMENT 13

Figure 12:
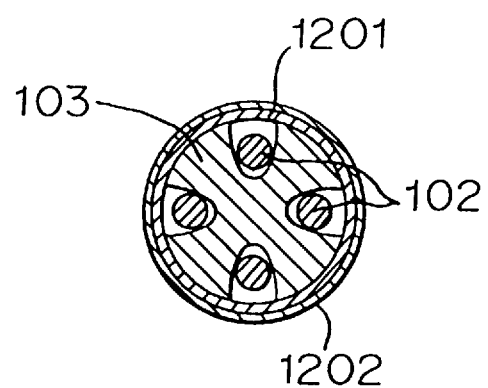
FIG. 12 is a cross-sectional view showing the essential parts of the radiation detector according to a thirteenth embodiment of the present invention.

In FIG. 12, there is shown a cross-sectional view of the essential parts of the radiation detector according to a thirteenth embodiment of the present invention. In this figure, reference numeral 1201 designates a heat insulating tape. Reference numeral 1202 designates a shade tape. The scintillation fibers 102 are arranged in the scattering member 103.

The operation of this embodiment will be explained.

When the scattering member 103 with the scintillation fibers 102 arranged therein is wound with the shade tape 1202, e.g. a way to coat the tape by application of heat may be adopted. There is a possibility that the scintillation fibers 102 have a temperature raised to above the softing point thereof. In such a case, the characteristics of the scintillation fibers 102 may be changed. In order to cope with this problem, the heat insulating tape 1201 is arranged between the scattering member 103 and the shade tape 1202 as shown to prevent the scintillation fibers 102 from changing in terms of the characteristics thereof or being deformed, and to avoid heat deterioration by application of heat.

EMBODIMENT 14

Figure 13A:
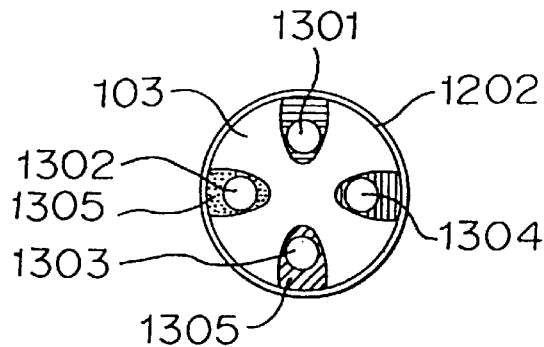
FIG. 13(a) is a cross-sectional view showing the essential parts of the radiation detector according to a fourteenth embodiment of the present invention, and FIGS. 13(b) and (c) are explanatory diagrams showing the energy characteristics of the scintillation fiber according to the fourteenth embodiment.
Figure 13B:
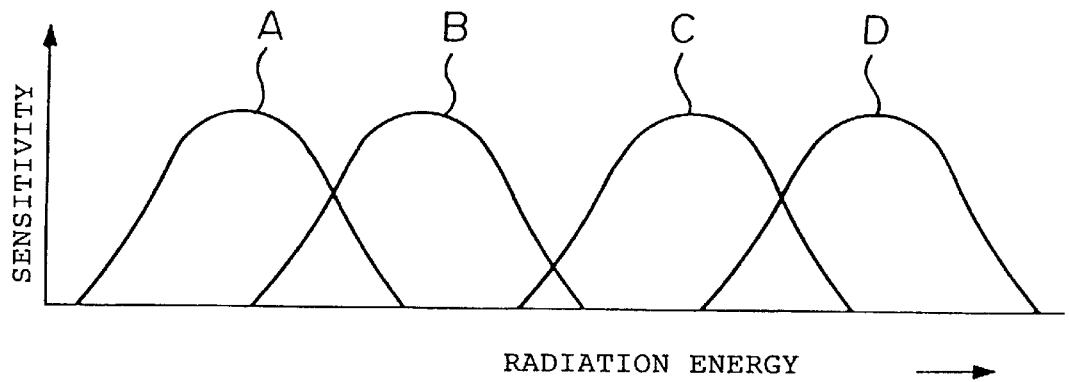
Figure 13C:
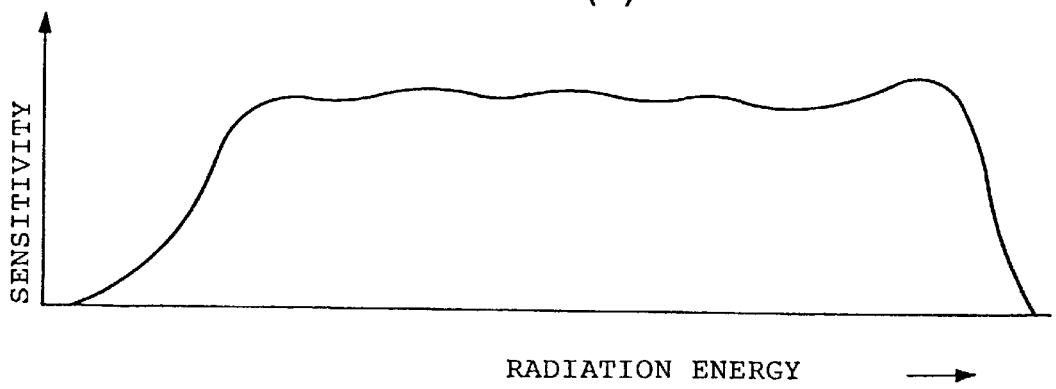

In FIGS. 13(a)–(c), there are shown a cross-sectional view and explanatory diagrams of the essential parts of the radiation detector according to a fourteenth embodiment of the present invention. In FIG. 13(a), reference numerals 1301, 1302, 1303 and 1304 designate scintillation fibers. Reference numeral 1305 designates scattering members which are made of different materials. In this embodiment, the scattering member 103 has a plurality of grooves formed therein to arrange the scintillation fibers 1301–1304 therein. The scattering members 1305 which are made of different materials are arranged to surround the respective scintillation fibers.

The materials (atomic number and density) of the scattering members 1305 which are arranged to surround the respective scintillation fibers 1301–1304 can vary from one to another to make the sensitivity (energy characteristics) of the respective scintillation fibers 1301–1304 different. The presence of such different sensitivities is shown in FIG. 13(b). Curves A, B, C and D designate the energy characteristics of the respective scintillation fibers 1301–1304. Although signal outputs from the respective scintillation fibers 1301–1304 may be detected by different measuring units, all scintillation fiber signals may be detected by a single measuring unit. In the latter case, the energy characteristics of a radiation to be measured are a superposition of the energy characteristics of the respective scintillation fibers as shown in FIG. 13(c). The measuring unit may be connected to only one end or opposite ends of the radiation detecting portion. Such arrangement can obtain energy characteristics having flat sensitivity by a suitable combination of the scattering elements made of different materials.

EMBODIMENT 15

In FIG. 14(a), there is shown a cross-sectional view of the essential parts of the radiation detector according to a fifteenth embodiment of the present invention. In FIGS. 14(b) and (c), there are shown explanatory diagrams explaining how to transmit light. In FIG. 14(a), reference numeral 1401 designates an optical element which is arranged between a scintillation fiber 102 and an optical fiber for transmission 501, and which has a light-gathering function. The optical element 1401 may comprise e.g. a distribution refractive index type lens. The optical element is fixed to the end surfaces of the respective fibers by use of e.g. an optical cement. The inner connection pipes 601 which are put on connecting ends of the respective fibers have the same outer diameter. Reference numeral 602 designates an outer connection pipe which has the same inner diameter as the outer diameters of the respective inner connection pipes 601 and the outer diameter of the optical element 1401. The optical element 1401, the scintillation fiber 102, the optical fiber for transmission 501, the inner connection pipes 601 and the outer connection pipe 602 have center axes aligned one another.

As shown in FIG. 14(b), lack of the optical element 1401 with a light-gathering function, in some cases, allows light to be incident on the optical fiber for transmission 501 at an angel above the numerical aperture of the optical fiber when a light signal is transmitted from the scintillation fiber 102 to the optical fiber 501. Such cases occur when the numeral aperture of the scintillation fiber 102 is larger than that of the optical fiber 501. In such cases, part of the light which goes out of the scintillation fiber 102 can not be confined in the optical fiber for transmission 501, and such part goes out of the optical fiber 501 to fail to reach a measuring unit.

In accordance with this embodiment, as shown in FIG. 14(c), the optical element 1401, which has a light-gathering function to have a large numerical aperture at the incident side of light and a low numerical aperture at the outgoing side of light, is arranged between the scintillation fiber 102 and the optical fiber for transmission 501 to match the numerical aperture at the outgoing side with the numerical aperture of the optical fiber for transmission 501.

In the arrangement according to this embodiment, even light which goes out of the scintillation fiber 102 at a larger numerical aperture than that of the optical fiber for transmission 501 can be confined in the numerical aperture of the optical fiber for transmission 501 to minimize loss due to the difference of the numerical apertures when the light reaches the end surface of the optical fiber for transmission 501. It is possible to improve the counting efficiency of a light signal i.e. the sensitivity at a measuring unit. It is also possible to make the transmission to the measuring unit long-distance.

EMBODIMENT 16

Figure 15:
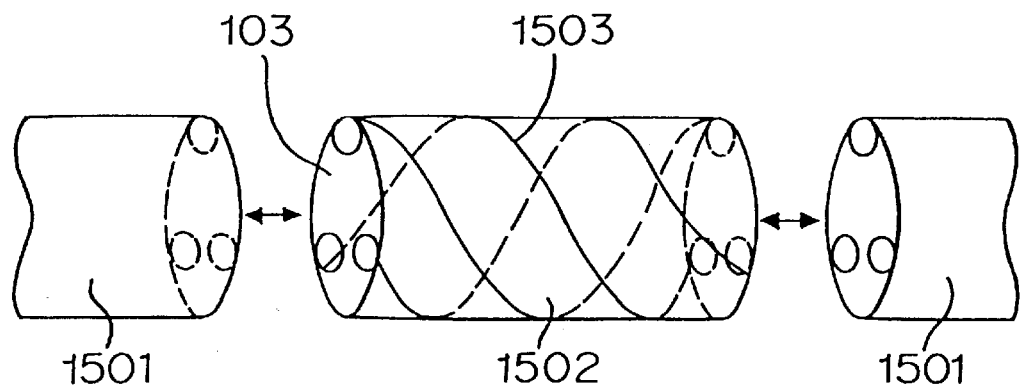
FIGS. 15 is a schematic view showing the essential parts of the radiation detector according to a sixteenth embodiment of the present invention.
Figure 16:
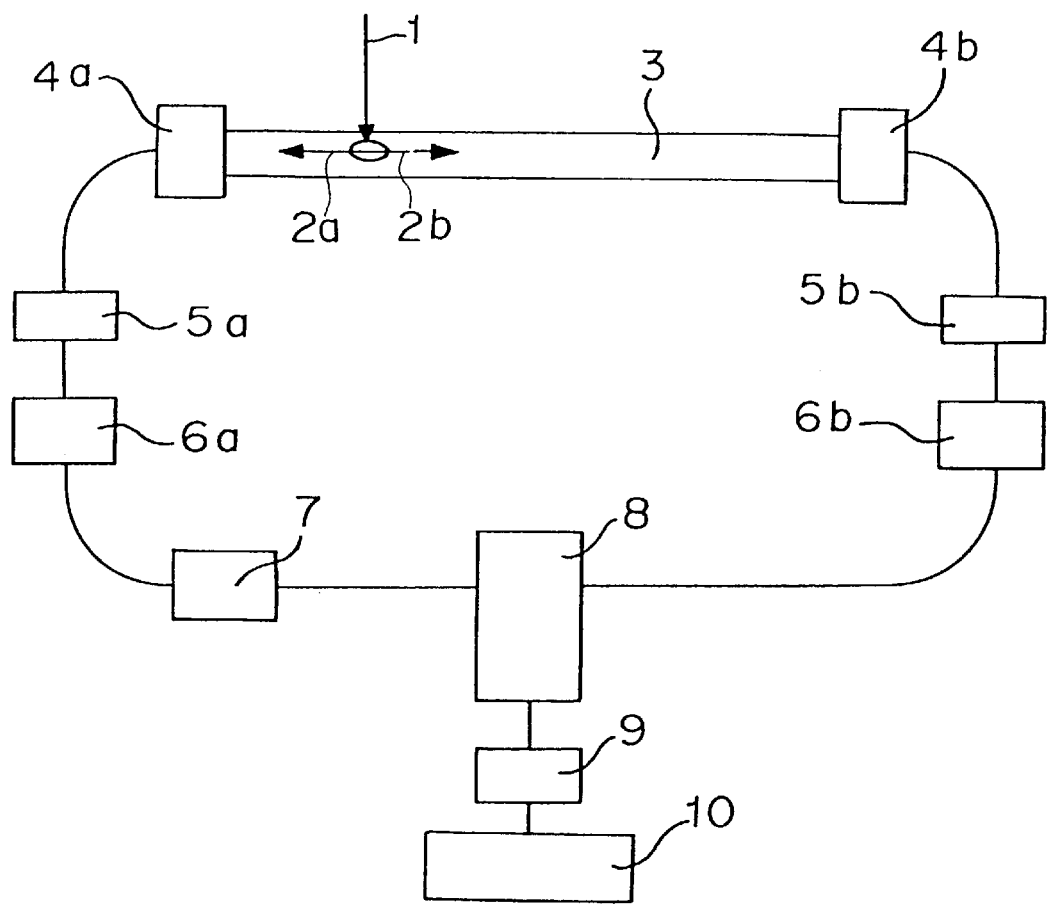
FIG. 16 is a block diagram showing the structure of a conventional scintillation fiber used radiation detector.

In FIG. 15, there is shown a schematic view of the essential parts of the radiation detector according to a sixteenth embodiment of the present invention. In FIG. 15, reference numeral 1501 designates optical fiber cables for transmission with plurality of optical fibers for transmission housed therein. Reference numeral 1502 designates a radiation detecting portion which includes a plurality of scintillation fibers 102 and the scattering member 103. Reference numeral 1503 designates the scintillation fibers arranged on the scattering member 103, or composite fibers constituted by a scintillation fiber and an optical fiber for transmission and arranged on the scattering member 103. Even if a radiation is incident on the optical fibers for transmission, the optical fibers for transmission do not react with the radiation.

The scintillation fibers are difficult to carry out a wide range of measurement as a radiation detecting portion by themselves since the scintillation fibers generally have great transmission loss. In order to cope with this problem, the scintillation fibers are connected to the optical fibers for transmission to restrain the transmission loss in the scintillation fibers by reduction in the length of the scintillation fibers.

In the sixteenth embodiment, the scattering member 103 is arranged only at the radiation detecting portion 1502, and no scattering member 103 is arranged on the optical fibers for transmission other than the optical fibers for transmission arranged in the radiation detecting portion although in the fifth embodiment the optical fibers for transmission are connected in the scattering member 103. The radiation detecting portion 1502 and the optical fiber cables for transmission 1501 are connected by e.g. a multiconductor connector or by bonding.

Such arrangement can separate the manufacture of the radiation detecting portion 1502 and the manufacture of the optical fiber cables for transmission 1501 to shorten the production time and reduce cost. The absence of the scattering member 103 in the optical fiber cables for transmission 1501 can reduce the expense incurred for the scattering member.

In addition, it is possible to carry out further long-distance transmission of light signal as well as to offer the advantages like the first embodiment, to remotely arrange the radiation detecting unit and a measuring unit, thereby realizing telemetering.

What is claimed is:

1. A scintillation fiber type radiation detector comprising:
    at least one scintillation fiber for producing a light pulse in response to a radiation, the light pulse being detected at one end or opposite ends of the scintillation fiber to obtain radiation information; and
    at least one scattering member for emitting an electron by interaction with the radiation;
    wherein the scintillation fiber is arranged in or on the scattering member, and
    the scattering member is made of a material having a high atomic number.

2. A scintillation fiber type radiation detector according to claim 1, wherein the scintillation fiber is connected to an optical fiber for transmission having lower transmission loss than the scintillation fiber, and
    the scintillation fiber and the optical fiber for transmission are connected to provide a composite fiber, and the composite fiber has only a portion with the scintillation fiber included therein as a radiation detecting portion provided with the scattering member, and a light signal from the radiation detecting portion is transmitted through the optical fiber.

3. A scintillation fiber type radiation detector according to claim 1, wherein the scattering member is made of a noncombustible material, and the scintillation fiber is made of a quartz material.

4. A scintillation fiber type radiation detector according to claim 1, wherein the scintillation fiber is spirally arranged in or on the scattering member.

5. A scintillation fiber type radiation detector according to claim 1, wherein the scattering member with the scintillation fiber arranged therein or thereon is wound by a heat insulating tape.

6. A scintillation fiber type radiation detector according to claim 1, wherein a plurality of scattering members are made of different materials, and a plurality of scintillation fibers are surrounded by the different scattering members.

7. A scintillation fiber type radiation detector comprising:
    at least one scintillation fiber for producing a light pulse in response to a radiation, the light pulse being detected at one end or opposite ends of the scintillation fiber to obtain radiation information; and
    at least one scattering member for emitting an electron by interaction with the radiation;
    wherein the scintillation fiber is arranged in or on the scattering member, and
    the scattering member has at least one groove formed therein, and the scintillation fiber is arranged in the groove.

8. A scintillation fiber type radiation detector according to claim 7, wherein the groove is formed in an outer peripheral portion of the scattering member.

9. A scintillation fiber type radiation detector according to claim 7, wherein a plurality of grooves are formed in an outer peripheral portion of the scattering member and the respective grooves include scattering members made of different materials.

10. A scintillation fiber type radiation detector comprising:
    at least one scintillation fiber for producing a light pulse in response to a radiation, the light pulse being detected at one end or opposite ends of the scintillation fiber to obtain radiation information; and
    at least one scattering member for emitting an electron by interaction with the radiation;
    wherein the scintillation fiber is arranged in or on the scattering member,
    wherein the scintillation fiber is connected to an optical fiber for transmission having lower transmission loss than the scintillation fiber, and
    the scintillation fiber and the optical fiber having connecting ends covered by inner connection pipes so that the inner connection pipes have connecting end surfaces flush with connecting end surfaces of the scintillation fiber and the optical fiber, the inner connection pipes having respective inner diameters identical to respective outer diameters of the scintillation fiber and the optical fiber, and the scintillation fiber and the optical fiber are connected by inserting the inner connection pipes in a single outer connection pipe having respective inner diameters identical to respective outer diameters of the respective inner connection pipes, and interposing an optical element having a light-gathering function between the scintillation fiber and the optical fiber.

11. A scintillation fiber type radiation detector comprising:
    at least one scintillation fiber for producing a light pulse in response to a radiation, the light pulse being detected at one end or opposite ends of the scintillation fiber to obtain radiation information; and
    at least one scattering member for emitting an electron by interaction with the radiation;
    wherein the scintillation fiber is arranged in or on the scattering member,
    wherein the scintillation fiber is connected to an optical fiber for transmission having lower transmission loss than the scintillation fiber, and
    a plurality of scintillation fibers and a plurality of optical fibers for transmission are connected to provide a plurality of composite fibers, and the composite fibers are arranged to have a portion with the scintillation fiber included therein relatively shifted in a longitudinal direction thereof.

* * * * *